(12) United States Patent
Kuris et al.

(10) Patent No.: US 11,262,983 B2
(45) Date of Patent: Mar. 1, 2022

(54) SERVICES INTEGRATION IN AN INTEGRATED DEVELOPMENT ENVIRONMENT (71) Applicant: Red Hat, Inc., Raleigh, NC (US)

(72) Inventors: Eran Kuris, Raanana (IL); Arie Bregman, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/425,042

(22) Filed: May 29, 2019

(65) Prior Publication Data

US 2020/0379736 A1 Dec. 3, 2020

(51) Int. Cl.
*G06F 8/33* (2018.01)
*G06F 9/54* (2006.01)
*G06F 8/71* (2018.01)

(52) U.S. Cl.
CPC ................ *G06F 8/33* (2013.01); *G06F 8/71* (2013.01); *G06F 9/54* (2013.01)

(58) Field of Classification Search
CPC ................ G06F 8/33; G06F 8/71; G06F 9/54
See application file for complete search history.

(56) References Cited

U.S. PATENT DOCUMENTS

| 7,284,233 | B2* | 10/2007 | Sengodan | G06F 40/117 |
| | | | | 717/102 |
| 7,395,312 | B2 | 7/2008 | Kothari et al. | |
| 9,348,579 | B2 | 5/2016 | Xia et al. | |
| 2007/0250810 | A1* | 10/2007 | Tittizer | G06F 8/73 |
| | | | | 717/110 |
| 2008/0005235 | A1 | 1/2008 | Hegde et al. | |
| 2010/0205544 | A1* | 8/2010 | Brzeski | H04L 12/66 |
| | | | | 715/758 |
| 2014/0282097 | A1* | 9/2014 | Edlund | G06Q 10/103 |
| | | | | 715/753 |
| 2017/0075790 | A1* | 3/2017 | Macleod | G06F 11/3668 |
| 2017/0357486 | A1 | 12/2017 | DeLuca et al. | |
| 2020/0192638 | A1* | 6/2020 | Pezaris | G06F 8/41 |

OTHER PUBLICATIONS

Maximov, Kirill, "IDETalk", https://plugins.jetbrains.com/plugin/233-idetalk, Feb. 27, 2019, 9 pages.
Miller, Ron, "CodeStream Wants to Move Developer Chat Straight to the Source Code", https://techcrunch.com/2018/03/08/codestream-wants-to-move-developer-chat-straight-to-the-source-code/, Feb. 27, 2019, 8 pages.
Codestream, "Better Teamwork. Better Code", https://www.codestream.com/, Feb. 27, 2019, 5 pages.

* cited by examiner

*Primary Examiner* — Wei Y Zhen
*Assistant Examiner* — Amir Soltanzadeh
(74) *Attorney, Agent, or Firm* — Lowenstein Sandler LLP (57) ABSTRACT Implementations for services integration in an integrated development environment (IDE) are described. An example method may include receiving a selection of a portion of source code in an IDE, providing a list of options to perform with respect to the selected portion of the source code, the options corresponding to services external to the IDE, receiving an indication of a selected option of the options from the list, identifying an owner of the selected portion of the source code, and causing one or more functions corresponding to the selected option to be performed with respect to the selected portion of the source code and the identified owner, wherein the one or more functions are integrated into the IDE for execution.

9 Claims, 6 Drawing Sheets

FIGURE 6

SERVICES INTEGRATION IN AN INTEGRATED DEVELOPMENT ENVIRONMENT

TECHNICAL FIELD

The disclosure is generally related to integrated development environments (IDEs), and more particularly, to services integration in an IDE.

BACKGROUND

Integrated development environments (IDEs) provide programmers with tools that help in the development of new software. An IDE provides a set of tools, such as editing and debugging software for programmers. These tools are utilized to create and to debug new software programs. The IDE supports software development by providing a windowed system for source file editing, project management, file interdependency management, and debugging. Some IDEs are structured as plug-in based software models where the components of the IDE are structured as plug-ins for the IDE.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Described herein is a system for services integration in an integrated development environment (IDE). An IDE can be an application for assisting a user in managing a software programming project. The IDE assists in the management of source files and binary files, program compiling, source file editing and similar tasks associated with software development.

Users of IDE systems often prefer to generate and modify code in the IDE system using a collaborative approach. For example, a user (e.g., developer) accessing an IDE may work on a portion of source code that the user did not author. The user may want to contact an owner of that particular portion of source code for further conversation or may want to consult with other users (other developers) in order to collaborate on the portion of source code. In some cases, the user may want to collaborate on how a particular portion of code is running when executed and discuss the results of such execution. In conventional IDE systems, the communication and collaboration around source code development is rudimentary, and in some cases non-existent. Collaboration around source code development in IDE systems can be a time-consuming and resource-consuming task involving context switching between applications with unsatisfactory results.

Aspects of the disclosure address the above and other deficiencies by providing technology that integrates external services into the IDE. In implementations of the disclosure, the IDE can have a set of integrated external service component tools (also referred to herein as "tools"). These tools are associated with and interface with external service components, which are separate from the IDE, and can assist the user in debugging, editing, compiling, deploying, testing, communicating, or similarly managing the project. The tools are specific to each of the external service components and allow the user to interface with the functionality of those external service components within the IDE.

External service components may include, but are not limited to, electronic mail (email) programs, real-time communication programs such as instance messaging (IM) programs, code hosting services for version control, source code management systems, continuous integration and continuous delivery (CI/CD) systems, container platform systems, and/or any other tool or service used in the day-to-day code development lifecycle. The tools may be associated with a defined set of tool-specific general purpose or intermediate functions (may be referred to herein as functions) and a general purpose integration framework. The functions enable the tools to interface with each external service component.

The tools can receive a user selection of source code, or a user selection of a portion of the source code, with which a user wants to interact. The tools may then utilize an integration framework of the IDE and specific functions to call an external service component. The integration framework and functions can return the output of the external service component. The tools can then process this output data for purposes of interacting with the selected source code being developed in the IDE in an integrated and convenient way. The integration framework in combination with the functions and tools enable interfacing with the functionality of external service components in the IDE as an integrated visual experience.

As such, the systems and methods described herein include technology that enhances utilization of computing resources, such as processor usage and memory usage, for a computer system. In particular, aspects of the disclosure provide technology that enhances the efficiency and/or performance of a computing system by integrating external services into the IDE system. This may enhance the efficiency and performance of the computer system by reducing processor and memory usage and improving network bandwidth due to reducing context switching between the IDE and applications that may provide the external services.

Various aspects of the above referenced methods and systems are described in details herein below by way of examples, rather than by way of limitation.

Figure 1:
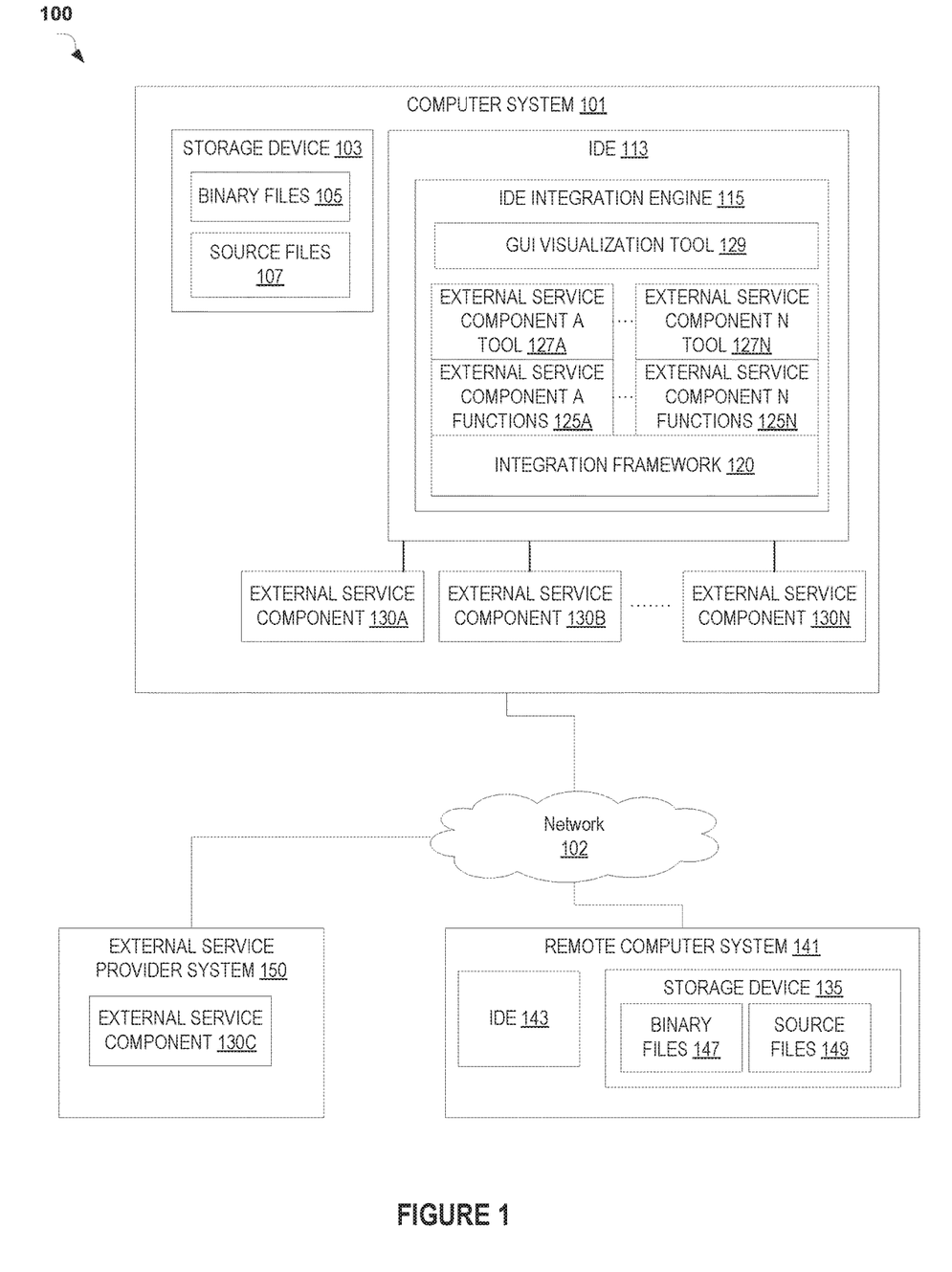
FIG. 1 depicts a high-level block diagram of an example computer system architecture, in accordance with one or more aspects of the disclosure.

FIG. 1 is a diagram of one embodiment of a system for services integration in an IDE. In one embodiment, a computer system 101 implements an IDE 113 and a set of stand-alone external service components 130A-130N, and includes a storage device 103. In one implementation, the IDE 113 implements an integration engine to enable the integration of the external service components 130A-130N in the IDS 113. In on implementation, the IDE 113 and the integration engine 113 are a part of a distributed system. In the distributed system embodiment, the computer system 101 communicates over a network 102 with a remote computer system 141. The distributed system can include any number of additional computer systems 141. For sake of clarity, a distributed system implementation with a single additional computer system 141 is described. One skilled in the art would understand that any number of additional computer systems could be included in a distributed system that incorporate similar features, functions and structures.

The computer system 101 can be any type of computing device including a desktop computer, a workstation, a dedicated server, a handheld device or a similar computing device. The network 102 may be may be a private network (e.g., a local area network (LAN), a wide area network (WAN), intranet, or other similar private networks) or a public network (e.g., the Internet). The network 102 can include any number of intermediate computing devices and network elements between the communicating computer systems 101, 141. The network 102 can include any number or combination of wired and wireless communication mediums between the nodes in the network. Other computer systems 141 can also be any type of computing device including a desktop computer, a workstation, a dedicated server, a handheld computer system or similar computing device.

The computer system 101 can include any type and number of storage devices 103. The storage devices 103 can be fixed disk drives, removable storage medium drives that are external or internal drives, random access memory (RAM), static memory or similar storage devices. The storage devices 103 can be used to store a set of binary files 105 and source files 107, as well as, installed programs and tools including the IDE 113 and external service components 130A-130N. The binary files 105 and source files 107 are data files that are part of a programming project managed by the IDE 113. The binary files 105 may refer to compiled code generated from the source files 107. The source files 107 may refer to sets of program instructions in a high level computer language, such as like C or C++. A 'set,' as used herein refers to any positive whole number of items including one item.

The IDE 113 is an application for assisting a user in managing a software programming project. The IDE 113 assists in the management of source files 107 and binary files 105, program compiling, source file editing and similar tasks associated with software development. In one embodiment, the IDE 113 is the ECLIPSE® IDE. The IDE 113 can have a set of integrated external service component tools 127A-127N (also referred to herein as tools 127A-127N). These tools 127A-127N are associated with and interface with external service components 130A-130N, which are separate from the IDE 113, and can assist the user in debugging, editing, compiling, deploying, testing, communicating, or similarly managing the project. The sets of tools 127A-127N are specific to each of the external service components 130A-130N and allow the user to interface with the functionality of those external service components 130A-130N within the IDE 113.

The external service components 130A-130N are standalone utilities or programs. The framework 120 and functions 125A-125N of the integration engine 115 of the IDE 113 enable the interfacing of the IDE 113 with these external components 130A-130N and the utilization of the output of these components 130A-130N within the IDE 113 environment via tools 127A-127N. The tools 127A-127N may refer to a software component that adds a specific feature to the IDE. The tools 127A-127N may enable an integration with the source code 107 developed in the IDE 113 and the output of the external components 130A-130N. In one implementation, the tools 127A-127N may be a plug-in, an add-on, or any other functionality enabling customization of the IDE 113.

External service components 130A-130N may include, but are not limited to, email programs, real-time communication programs such as IM programs, code hosting services for version control, source code management systems, CI/CD systems, container platform systems, and/or any other tool or service used in the day-to-day code development lifecycle. In one implementation, the external service components 130A-130N may include external such as command line programs for use on an operating system (OS) platform, such as the LINUX® platform. In some implementations, one or more of the external service components 130A-130N are hosted on a computing system, such as external service provider system 150, that is external to the computer system 101 hosting the IDE 113. For example, as shown in FIG. 1, external service component 130C is illustrated as being hosted on external service provider system 150, which is separate from computer system 101 hosting IDE 113.

The tools 127A-127N may be associated with a defined set of tool-specific general purpose or intermediate functions 125A-125N (may be referred to herein as functions 125A-125N) and a general purpose integration framework 120. The functions 125A-125N enable the tools 127A-127N to interface with each external service component 130A-130N. The functions 125A-125N may refer to a type of procedure or routine of the external service component 130A-130N that cause a specific task to be performed. The integration framework 120 can support interfacing with external utilities or programs, such as the external service components 130A-130N. The integration framework 120 defines a set of functions that provides access to data structures and resources of the IDE to the tools 127A-127N of the IDE 113.

The set of tool-specific functions 125A-125N define functions for calling the corresponding external service components 130A-130N and passing parameters, such as a selected binary 105, to the external service component 130A-130N. In some implementations, the functions 125A-125N return the output of the external service component 130A-130N to be further processed by the tools 127A-127N. The functions 125A-125N can utilize command line interfaces (CLIs) or application programming interfaces (APIs) of the external service components 130A-130N and make such interfaces accessible to the tools 127A-127N via the integration framework 120.

The tools 127A-127N receive a selection of source code 107, or a portion source code 107, that a user wants to process. The tools 127A-127N may then utilize the integration framework 120 and specific functions 125A-125N to call an external service component 130A-130N. The integration framework 120 and functions 125A-125N return the output of the external service component 130A-130N. The tools 127A-127N can then process this output data for purposes of interacting with source code 107 being developed in the IDE 113 in an integrated and convenient way. In one embodiment, integration engine 115 may include a visualization tool 129 that includes a script that enables one or more of the tools 127A-127N to be visualized alongside the selected binary 105 to profile the features of the binary 105 in accordance with the services provided by the tool 127A-127N.

As such, the integration framework 120 in combination with the functions 125A-125N, and tools 127A-127N to enable interfacing with the functionality of the external service components 130A-130N in the IDE 113 environment as an integrated visual experience. For example, an external service component 130A may be an email program that provides a specific set of functions via functions 125A. A tool 127A corresponding to the email program can receive selection of a source code 107, or a portion (e.g., a line, a section, etc.) of the source code 107, being developed in the IDE 113, and can utilize the functions 125A to call the email program 130A to process and interact with the selected source 107 (e.g., generate an email message including the selection binary source code 107, addressed to a determined owner of the source code 107).

A further external service component 130A-130N integration example is using a tool 127A-127N to cause a real-time communication session (e.g., instant messaging, Jabber, Slack, etc.) to be initialized to enable for real-time discussion with the IDE 113 of selected source code 107. Another external service component 130A-130N integration example is using a tool 127A-127N to trigger an automated build in a CI/CD environment of selected source code 107. Using the integration engine 115 of the IDE 113, a list of jobs defined in the CI/CD environment can be obtained and one of those jobs can be triggered with the selected source code 107 from the IDE 113. An additional external service component 130A-130N integration example is using a tool 127A-127N to deploy selected source code 107 from the IDE 113 to an existing container of a container platform system, such as a Docker container platform system. In some implementations, the container may be hosted on the local computer system 101 or on an external computer system, such as systems 141, 150. Another external service component 130A-130N integration example is using a tool 127A-127N to submit selected source code 107 from the IDE 113 to a code quality system to analyze the quality of the code. Further details of integration of an external service component 130A-120N and associated interactions with the IDE 113 are discussed further below with respect to FIG. 2.

One skilled in the art would understand that the structures, functions, and principles described in regard to these specific examples are applicable to any external utility, program, or service that can be integrated and provided through a visual interface within the IDE 113, through a similar software structure, set of general function and tools. In further embodiments, the framework 120, general functions 125A-125N, and tools 127A-127N can be integrated into a monolithic plug-in or directly integrated into the IDE 113. Other permutations of these configurations are also within the scope of the invention.

In a distributed computing environment, a remote computer system 131 can be used to provide access to additional binary files 137 or source files 139 on the storage device 135 within the remote computer system 131. One of ordinary skill in the art would understand that any combination of resources can be provided over a network 102 by a computer system 131 to a user of an IDE 113 on the computer system 101. Similarly, the user of a computer system 131 and IDE 133 on that computer system 131 can interact with and utilize resources from the computer system 101 over the network 102. In this manner, the distributed computing environment enables the use of resources across the network 102 that allow a user of an IDE 113, 133 to access a larger range of resources that are distributed across each of the computer systems 101, 131.

Figure 2:
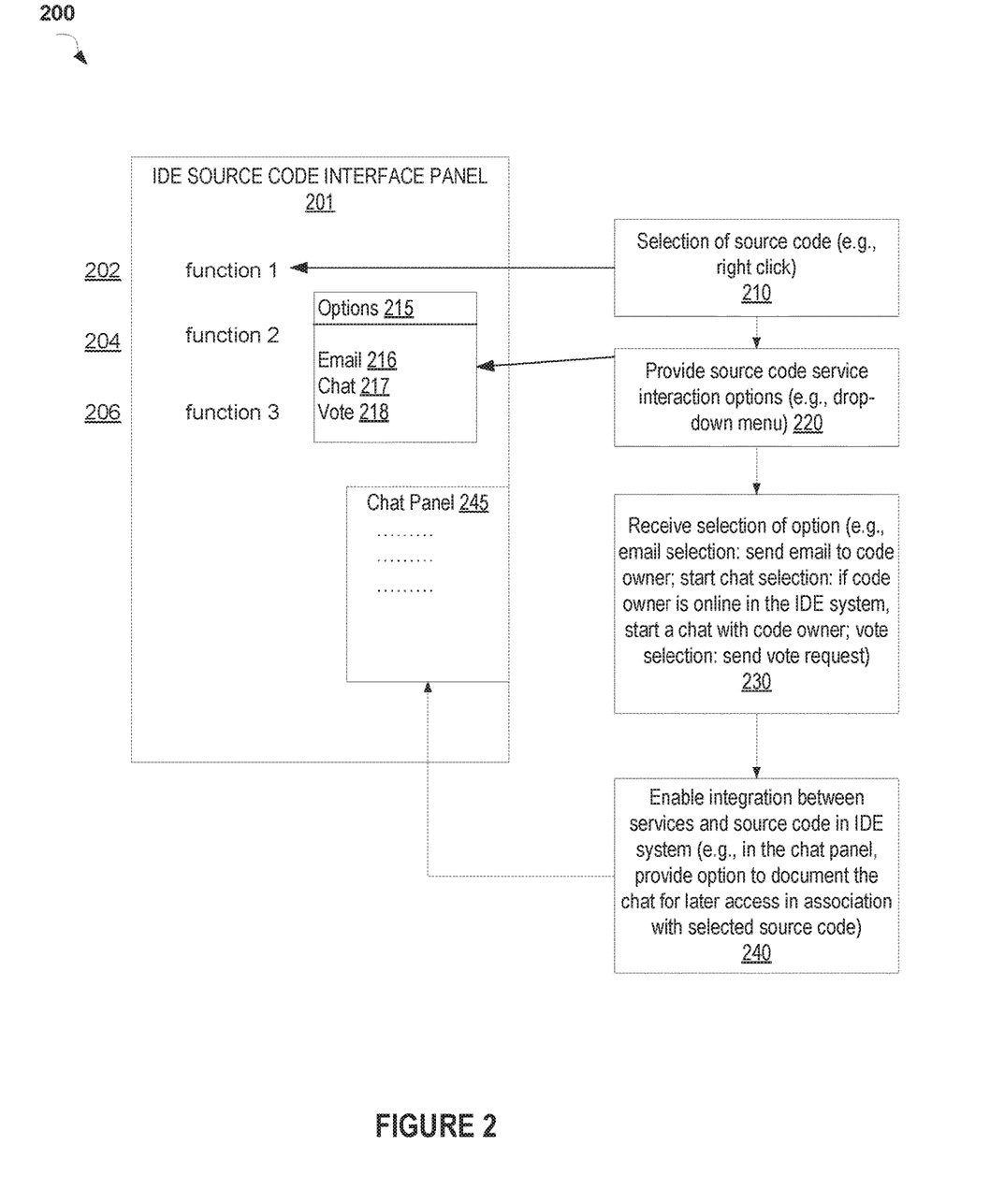
FIG. 2 depicts a functional block diagram illustrating an example integrated development environment (IDE) integrating a communication service, according to one or more aspects of the disclosure.

FIG. 2 is a functional block diagram illustrating an example IDE 200 integrating a communication service, according to implementations of the disclosure. IDE 200 includes an IDE source code interface panel 201. In one implementation, IDE 200 may be the same as IDE 113 described with respect to FIG. 1. IDE source code interface panel 201 may refer to a window or other interface of the IDE 200 that enables a user (e.g., a developer) to input and interact with source code. As shown in FIG. 2, IDE source code interface panel 201 presents pseudo source code including function 1 202, function 2 204, and function 3 206. In one implementation, source code 202, 204, 206, may be maintained in source file 107 of storage device 103 as described with respect to FIG. 1.

As discussed above, IDE 200 may be integrated with one or more external service components, such as external service components 130A-130N described with respect to FIG. 1. In the example implementation of FIG. 2, IDE 200 is integrated with external service components including an email client, a real-time messaging client, and a voting client. A user may interact with IDE source code interface panel 201 and select a portion of, or all of, source code 202, 204, 206. As shown in FIG. 2, the user may select 210 function 1 202 of the source code. In one implementation, the selection may include a highlighting of the pertinent portion of code and a right click of an input device (e.g., a mouse). Other interaction options are also envisioned in implementations of the disclosure and are not limited to highlighting and right clicking selections.

Upon selection of function 1 202 via the IDE source score interface panel 201, the IDE 200 may provide 220 a list of source code service interaction options. In one implementation, the options are provided via a drop-down menu presented to the user. Other presentation options (e.g., options listed in a separate panel or window, etc.) are also envisioned and are not limited to a drop-down menu. An integration engine of the IDE 200, such as integration engine 115 may maintain a list of possible service options to present to a user. As shown in FIG. 2, a drop down menu of options 215 is presented to the user in the Ide source code interface panel 201 and includes, but is not limited to, an email option 216, a chat option 217, and a vote option 218. The IDE 200 may then receive a selection 230 of one of the options 216-218 via the options menu 215 of the IDE source code interface panel 201.

In one example, if the user selects 230 the email option 216, the IDE 200 may interface with the email client (i.e., via functions 127A-127N and framework 120 of the IDE integration engine 115 in FIG. 1) to cause an email message to be opened that includes the selected source code of function 1 202 and having the recipient field of the email message populated with an email address of an "owner" of the selected function 1 202 source code. In one implementation, IDE 200 may execute a ownership determination command, such as "git blame" for source code of corresponding to GitHub repository, to determine ownership details of the selected portion of source code. The ownership determination command may be part of the functions 125A-125N corresponding to a source code management system external service component 130A-130N that manages the selected source code, as discussed above with respect to FIG. 1. The external service component tool 127A-127N that corresponds to the email client may parse the results of the ownership determination command to identify the email address corresponding to the owner of the selected source code and populate the recipient filed of the email message with this information. The tool 127A-127N of the IDE 200 may then cause the message to be sent to the identified owner via the email client.

In some implementations, the user may be able to use the integrated email client to send an executable version of the selected source code 202 as a file package of the code to the owner or another user. The user may be able to attach and/or include questions associated with the selected code in the email message. The user may also be able to modify the code and send the modified code via the email message integration with the IDE 200.

In a further example, if the user selects 230 the chat option 217, the IDE 200 may interface with the chat client (i.e., via functions 127A-127N and framework 120 of the IDE integration engine 115 in FIG. 1) to cause a real-time messaging interface to be provided in the IDE 200. In one implementation, the real-time messaging interface 245 (e.g., chat panel 245) may be provided within the IDE source code interface panel 201 of IDE or in a separate panel of the IDE 200. In one implementation, the real-time messaging interface may be initialized with a chat request to the owner of the selected source code using the ownership determination command described above. In some implementations, the real-time messaging interface may be initialized with a list of contacts that include users of the same organization as the developer that are currently logged into the IDE 200 (e.g., using LDAP credentials). In one implementation, the menu of options 215 may include a "share with"-type option that allows the selecting user to identify particular users in the organization that the user would like to share the selected source code with via the real-time messaging client. The user may specify one or multiple recipients. In some implementations, the user may be able to share the IDE source code interface panel 201 with one or more other users via the real-time messaging client as a collaborative sharing environment.

As noted above, the IDE 200 enables 240 integration between the external services and the source code 202, 204, 206 of the IDE 200 using the functionality of an integration engine, such as integration engine 115 discussed above with respect to FIG. 1. For example, in the chat panel 245, the IDE 200 provides further service integration options for the IDE 200 by providing an option to document the chat for later access in association with the selected source code 202.

In a further example, if the user selects 230 the vote option 218, the IDE 200 may interface with the chat client (i.e., via functions 127A-127N and framework 120 of the IDE integration engine 115 in FIG. 1) to cause a voting service interface to be provided in the IDE 200. The voting service interface may open a dialog that enables the input of modified or replacement code that is pertinent to the selected code 202, that can be shared with other users with an option to vote (e.g., thumbs up or thumbs down) on the replacement/modified code. This allows for a quick response from other developers who are currently connected to the IDE 200. The IDE 200 integration with the voting service enables the user to view the developer users in the panel who are currently connected to the IDE 200, and request a "vote" on the replacement/modified code portion from those developer users.

Figure 3:
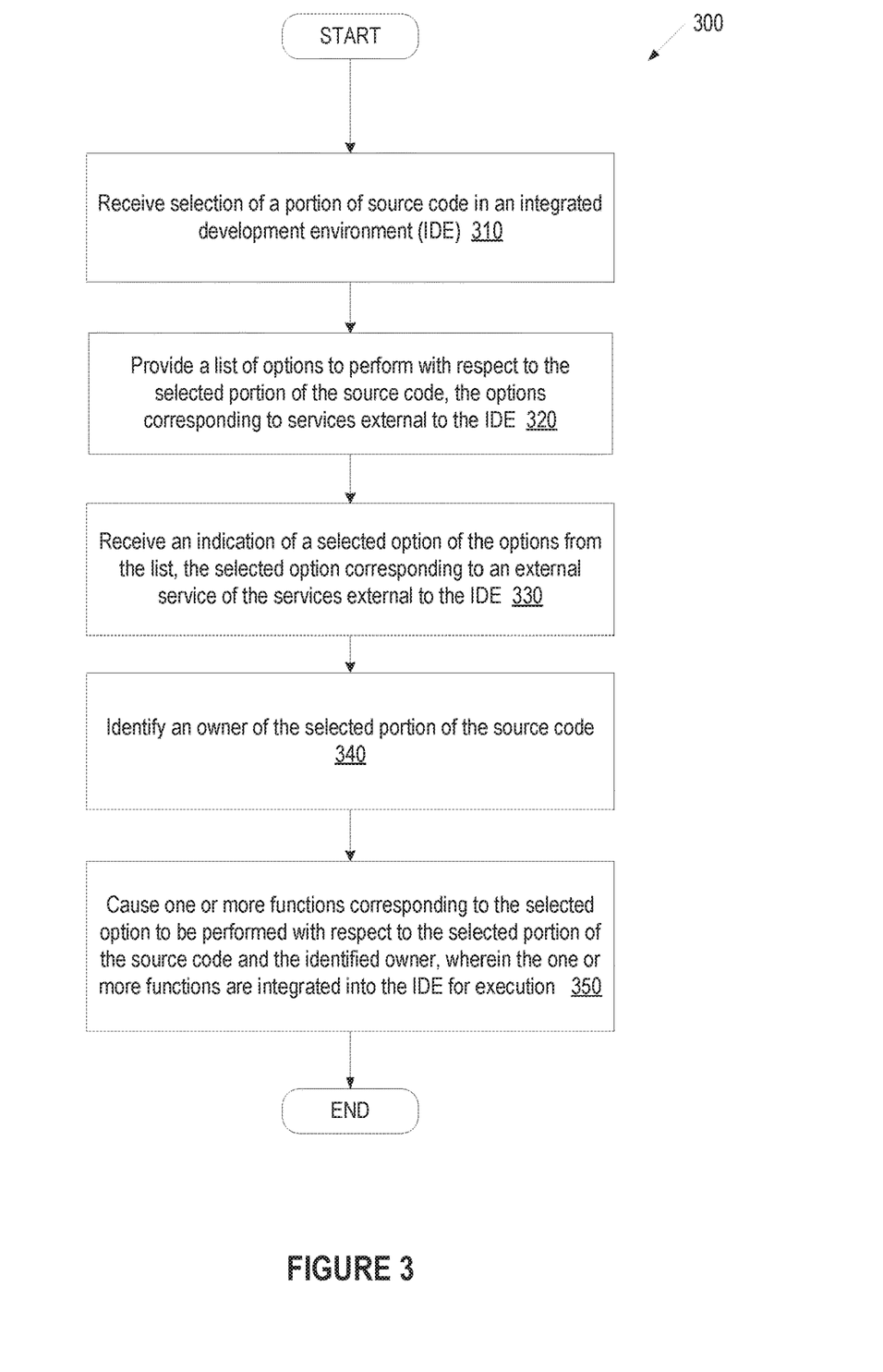
FIG. 3 depicts a flow diagram of an example method for integrating services in an IDE, in accordance with one or more aspects of the disclosure.
Figure 4:
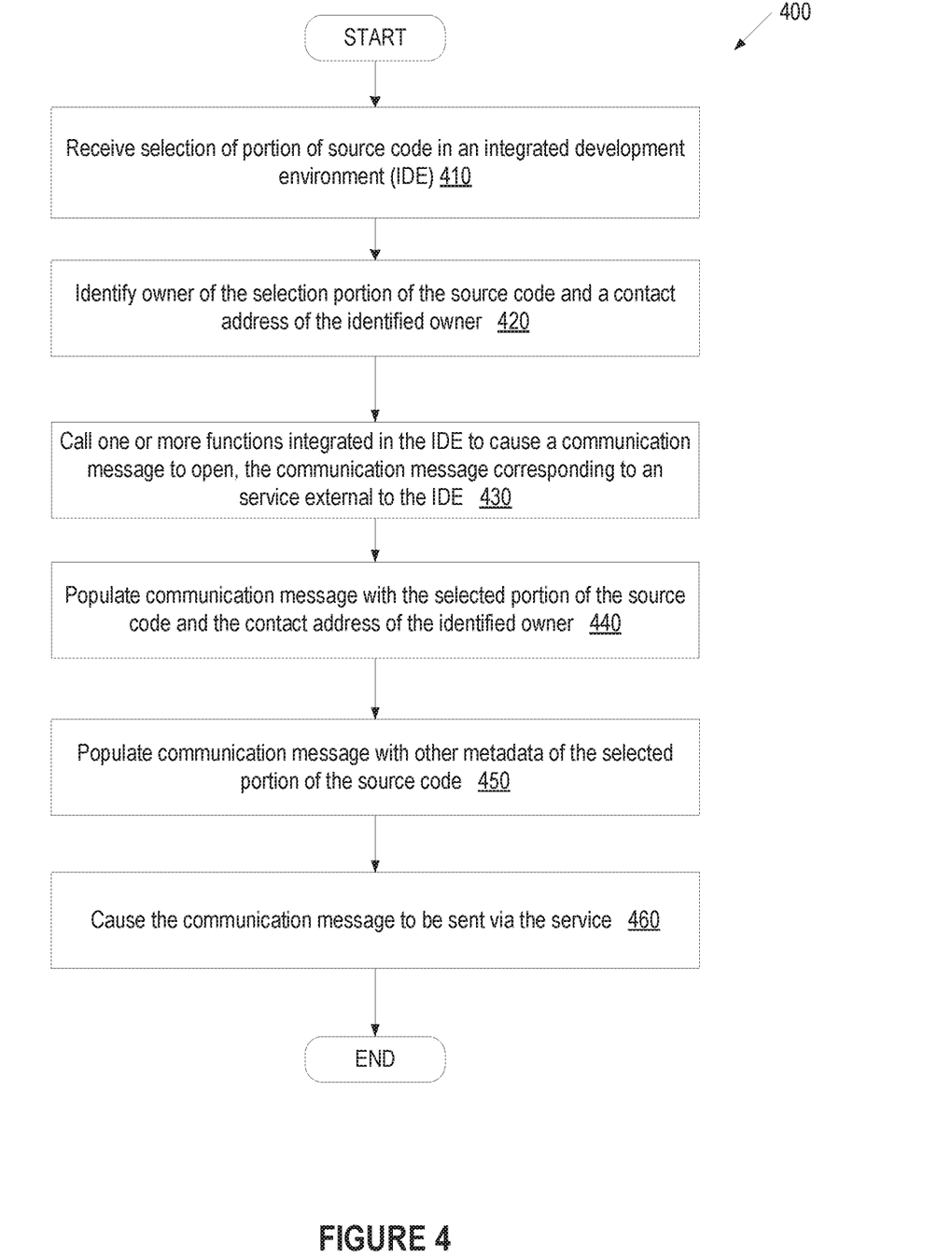
FIG. 4 depicts a flow diagram of an example method for integrating communication services in an IDE, in accordance with one or more aspects of the disclosure.

FIGS. 3 and 4 depict flow diagrams for illustrative examples of methods 300 and 400 for generating scenarios for automated execution of resources in a cloud computing environment, in accordance with one or more aspects of the disclosure. Method 300 illustrates an example process flow for integrating services in an IDE, according to at least one implementation. Method 400 is an example process flow for integrating communication services in an IDE, according to at least one implementation.

Methods 300 and 400 may be performed by processing devices that may comprise hardware (e.g., circuitry, dedicated logic, programmable logic, microcode, etc.), executable code (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 300 and 400 may be performed by IDE integration engine 115 as shown in FIG. 1.

Referring to FIG. 3, method 300 may be performed by processing devices of a server device or a client device and may begin at block 310. At block 310, a processing device may receive a selection of a portion of source code in an IDE. Then, at block 320, the processing device may provide a list of options to perform with respect to the selected portion of the source code. In one implementation, the selected option corresponding to an external service of the services external to the IDE. The services external to the IDE may include, but are not limited to, email programs, real-time communication programs such as IM programs, code hosting services for version control, source code management systems, CI/CD systems, container platform systems, and/or any other tool or service used in the day-to-day code development lifecycle.

Subsequently, at block 330, the processing device may receive an indication of a selected option of the options from the list. Then, at block 340, the processing device may identify an owner of the selected portion of the source code. Lastly, at block 350, the processing device may cause one or more functions corresponding to the selected option to be performed with respect to the selected portion of the source code and the identified owner. In one implementation, the one or more functions are integrated into the IDE for execution.

Referring to FIG. 4, method 400 may be performed by processing devices of a server device or a client device and may begin at block 410. At block 410, a processing device may receive a selection of a portion of source code in an IDE. At block 420, the processing device may identify an owner of the selected portion of the source code and a contact address of the identified owner. In one implementation, the IDE may execute a ownership determination command, such as a 'git blame' command, to identify the owner and contact address of the owner from the source code. Then, at block 430, the processing device may call one or more functions integrated in the IDE to cause a communication message to open. In one implementation, the communication message corresponds to a service external to the IDE. The service external to the IDE may include an email program or a real-time communication programs, such as an IM program.

Subsequently, at block 440, the processing device may populate the communication message with the selected portion of the source code and with the contact address of the identified owner. Then, at block 450, the processing device may optionally populate the communication message with other metadata of the selected portion of the source code. For example, the other metadata may include, but is not limited to, a project name associated with the source code or a branch identifier corresponding to the portion of the source code. Lastly, at block 460, the processing device may cause the communication message to be sent via the service.

Figure 5:
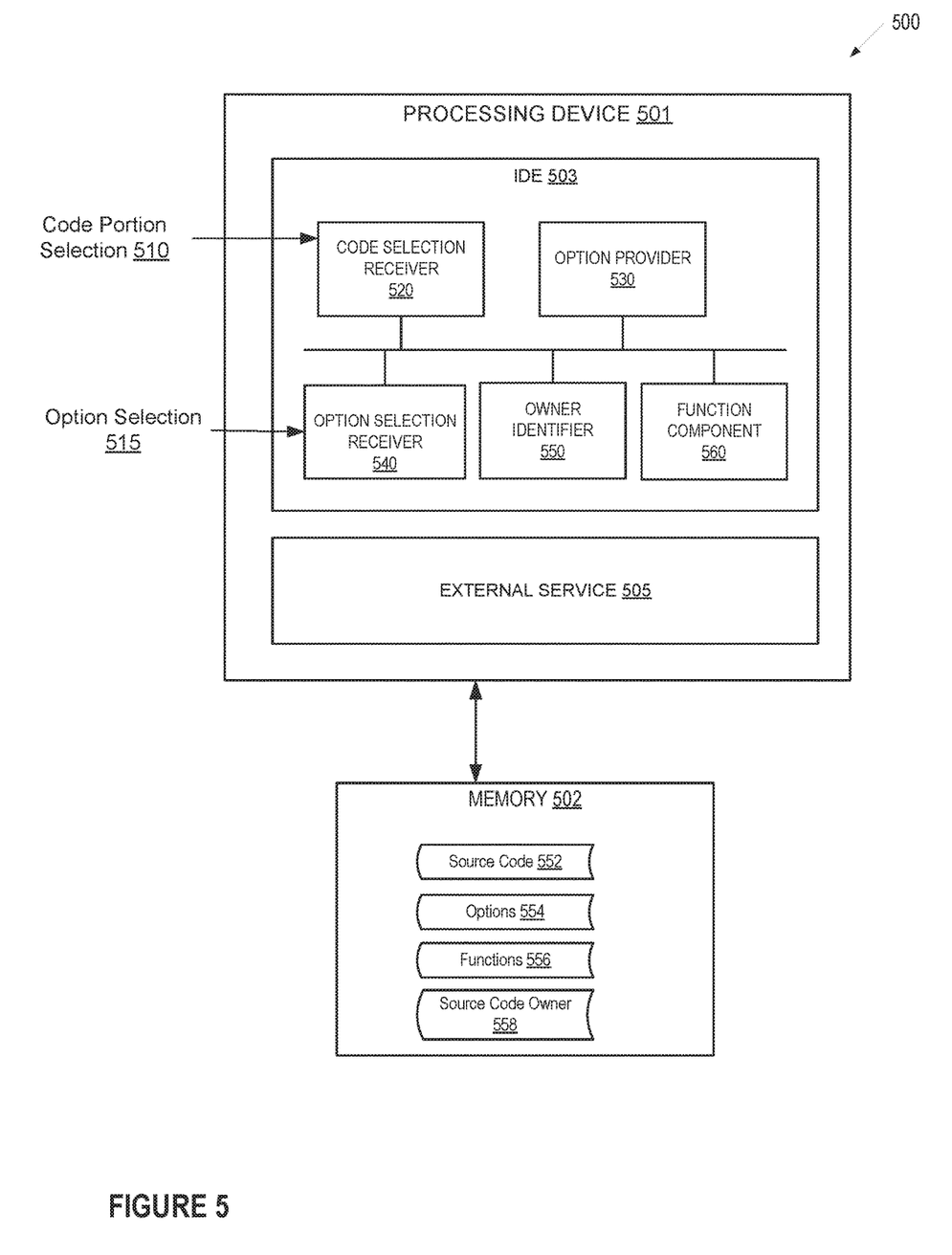
FIG. 5 depicts a block diagram of an example computer system in accordance with one or more aspects of the disclosure.

FIG. 5 depicts a block diagram of a computing system 500 operating in accordance with one or more aspects of the disclosure. Computing system 500 may be the same as computer system 101 108 described with respect to FIG. 1. Computing system 500 may include one or more processing devices 501 and one or more memory devices 502. In the example shown, the processing device 501 of computing system 500 may include an IDE 503. IDE 503 may be the same as IDE 113 described with respect to FIG. 1.

IDE 503 may include a code selection receiver 520, an option provider 530, an option selection receiver 540, and owner identifier 550, and a function component 560. The code selection receiver 520 may enable the processing device 501 to receive a selection 510 of a portion of source code 552 in the IDE 503. The option provider 530 may enable the processing device 501 to provide a list of options 554 to perform with respect to the selected portion of the source code 552. In one implementation, the options 554 correspond to services 505 external to the IDE 503.

The option selection receiver 540 may enable the processing device 501 to receive an indication 515 of a selected option of the options 554 from the list. The selection option 554 may correspond to an external service of the services 505 external to the IDE 503. The owner identifier 550 may enable the processing device 501 to identifying an owner 558 of the selected portion of the source code 552. Lastly, the function component 560 may enable the processing device 501 to call one or more functions 556 corresponding to the selected option 554 to cause an action of the respective external service 505 to be performed with respect to the selected portion of the source code 552 and the identified owner 558. In one implementation, the one or more functions 556 are integrated into the IDE 503 for execution.

Figure 6:
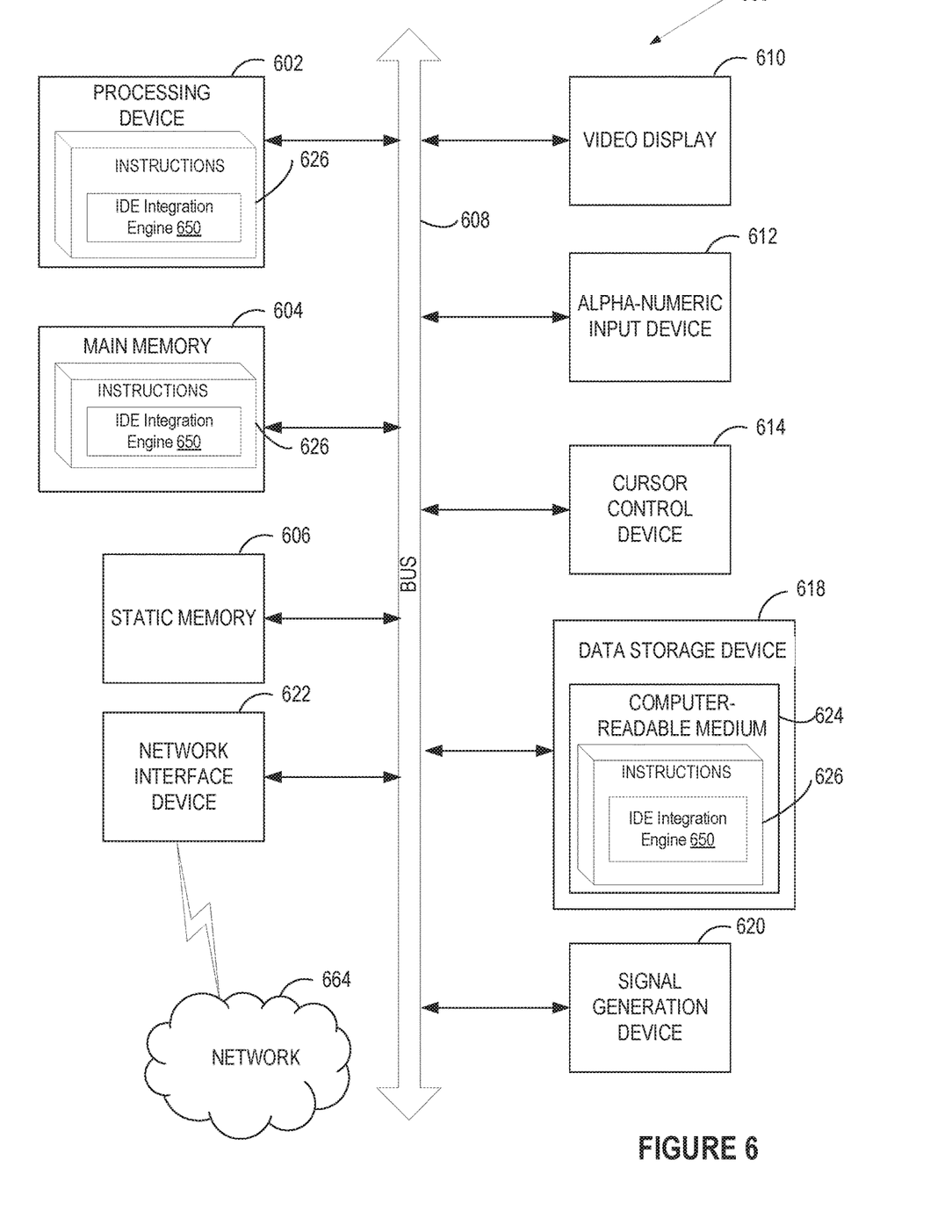
FIG. 6 depicts a block diagram of an illustrative computing device operating in accordance with the examples of the disclosure.

FIG. 6 depicts a block diagram of a computer system operating in accordance with one or more aspects of the disclosure. In various illustrative examples, computer system 600 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 400 for Ide integration engine 650 (which may be the same as IDE integration engine 115 of FIG. 1) and the modules illustrated in FIGS. 1, 2, and 5.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "verifying," "selecting," "receiving," "updating," "providing," "executing," "identifying," "calling," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A method comprising:

receiving, by a processing device executing an integrated development environment (IDE), a selected portion of source code in the IDE;

in response to receiving the selected portion of the source code, providing, by the processing device, a list of options comprising an option to share the selected portion of the source code with an owner of the selected portion of the source code using an external electronic messaging service that is hosted remotely from the processing device, wherein the selected portion of the source code is associated with at least one of: a job defined in a continuous integration/continuous deployment (CI/CD) environment, a container associated with a container platform system, or a submission to a code quality system;

in response to receiving, by the processing device, an input selecting the option from the list of options:

executing, by the processing device, an ownership determination command to identify the owner of the selected portion of the source code and an electronic messaging address of the owner of the selected portion of the source code; and composing, by the processing device, an electronic message corresponding to the external electronic messaging service by calling one or more functions integrated into the IDE to populate the electronic message with information related to the selected portion of the source code, wherein the information related to the selected portion of the source code comprises the selected portion of the source code, the electronic messaging contact address of the owner of the selected portion of the source code, and metadata of the selected portion of the source code, and wherein the metadata of the selected portion of the source code comprises a name of a project associated with the source code.

2. The method of claim 1, wherein the one or more functions utilize at least one of command line interfaces (CLIs) or application programming interfaces (APIs) of the external service to enable the IDE to access and communicate with the external service.

3. The method of claim 1, wherein the list of options is provided as a drop-down menu of the IDE.

4. The method of claim 1, further comprising providing a result of the one or more functions in a graphical user interface (GUI) of the IDE.

5. A system comprising:

a memory; and a processing device communicably coupled to the memory, the processing device to execute an integrated development environment (IDE) and to:

receive a selected portion of source code in the IDE;

in response to receiving the selected portion of the source code, provide a list of options comprising an option to share the selected portion of the source code with an owner of the selected portion of the source code using an external electronic messaging service that is hosted remotely from the processing device, wherein the selected portion of the source code is associated with at least one of: a job defined in a continuous integration/continuous deployment (CI/CD) environment, a container associated with a container platform system, or a submission to a code quality system;

in response to receiving an input selecting the option from the list of options:
   execute an ownership determination command to identify the owner of the selected portion of the source code and an electronic messaging address of the owner of the selected portion of the source code; and
   compose an electronic message corresponding to the external electronic messaging service by calling one or more functions integrated into the IDE to populate the electronic message with information related to the selected portion of the source code, wherein the information related to the selected portion of the source code comprises the selected portion of the source code, the electronic messaging contact address of the owner of the selected portion of the source code, and metadata of the selected portion of the source code, and wherein the metadata of the selected portion of the source code comprises a name of a project associated with the source code.

6. The system of claim 5, wherein the one or more functions utilize at least one of command line interfaces (CLIs) or application programming interfaces (APIs) of the external service to enable the IDE to access and communicate with the external service.

7. The system of claim 5, wherein the processing device is further to provide a result of the one or more functions in a graphical user interface (GUI) of the IDE.

8. A non-transitory machine-readable storage medium storing instructions that cause a processing device executing an integrated development environment (IDE) to:
   receive a selected portion of source code in the IDE;
   in response to receiving the selected portion of the source code, provide a list of options comprising an option to share the selected portion of the source code with an owner of the selected portion of the source code using external electronic messaging service that is hosted remotely from the processing device, wherein the selected portion of the source code is associated with at least one of: a job defined in a continuous integration/continuous deployment (CI/CD) environment, a container associated with a container platform system, or a submission to a code quality system;
   in response to receiving an input selecting the option of the options from the list of options:
      execute an ownership determination command to identify the owner of the selected portion of the source code and an electronic messaging address of the owner of the selected portion of the source code; and
      compose an electronic message corresponding to the external electronic messaging service by calling one or more functions integrated into the IDE to populate the electronic message with information related to the selected portion of the source code, wherein the information related to the selected portion of the source code comprises the selected portion of the source code, the electronic messaging contact address of the owner of the selected portion of the source code, and metadata of the selected portion of the source code, and wherein the metadata of the selected portion of the source code comprises a name of a project associated with the source code.

9. The non-transitory machine-readable storage medium of claim 8, wherein the one or more functions utilize at least one of command line interfaces (CLIs) or application programming interfaces (APIs) of the external service to enable the IDE to access and communicate with the external service.

\* \* \* \* \*